(12) United States Patent
Park et al.

(10) Patent No.: US 10,603,975 B2
(45) Date of Patent: Mar. 31, 2020

(54) STABILIZER

(71) Applicant: Hyundai Mobis Co., Ltd., Seoul (KR)

(72) Inventors: Jun Sung Park, Yongin-si (KR); Gyeong Hwi Min, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 93 days.

(21) Appl. No.: 15/794,704

(22) Filed: Oct. 26, 2017

(65) Prior Publication Data

US 2018/0043745 A1  Feb. 15, 2018

Related U.S. Application Data

(63) Continuation of application No. 15/095,348, filed on Apr. 11, 2016, now Pat. No. 9,878,589.

(30) Foreign Application Priority Data

Nov. 10, 2015 (KR) .................. 10-2015-0157394
Nov. 13, 2015 (KR) .................. 10-2015-0159564

(51) Int. Cl.
*B60G 21/055* (2006.01)
*B60G 3/20* (2006.01)

(52) U.S. Cl.
CPC ..... *B60G 21/0556* (2013.01); *B60G 21/0558* (2013.01); *B60G 3/20* (2013.01);
(Continued)

(58) Field of Classification Search
CPC ............ B60G 21/0555; B60G 21/0556; B60G 21/0558; B60G 2206/11; B60G 2206/427; B60G 2202/135; B60G 2202/42; B60G 2204/1224; B60G 2204/419; B60G 2204/4191; B60G 2204/422; B60G 2204/62; B60G 2200/144; B60G 3/20
See application file for complete search history.

(56) References Cited

U.S. PATENT DOCUMENTS 5,601,165 A 2/1997 Oppitz et al.
6,149,166 A 11/2000 Struss et al.
(Continued)

FOREIGN PATENT DOCUMENTS

CN 1724282 1/2006
CN 1746043 3/2006
(Continued)

OTHER PUBLICATIONS

Non Final Office Action dated May 17, 2017, in U.S. Appl. No. 15/095,348.
(Continued)

*Primary Examiner* — Laura Freedman
(74) *Attorney, Agent, or Firm* — H.C. Park & Associates, PLC

(57) ABSTRACT

Provided is a stabilizer capable of improving ride quality and adjustment stability. To this end, the automobile according to the exemplary embodiment of the present invention includes: an actuator; a first stabilizer bar which has one end coupled to one end of the actuator; a second stabilizer bar which has one end coupled to the other end of the actuator; and a decoupler which couples at least one of one end of the first stabilizer bar and one end of the second stabilizer bar to the actuator.

14 Claims, 11 Drawing Sheets

(52) U.S. Cl.
CPC .. *B60G 2200/144* (2013.01); *B60G 2202/135* (2013.01); *B60G 2202/42* (2013.01); *B60G 2204/1224* (2013.01); *B60G 2204/419* (2013.01); *B60G 2204/4191* (2013.01); *B60G 2204/422* (2013.01); *B60G 2204/62* (2013.01); *B60G 2206/11* (2013.01); *B60G 2206/427* (2013.01)

(56) References Cited

U.S. PATENT DOCUMENTS

| | | | |
|---|---|---|---|
| 6,425,585 | B1 | 7/2002 | Schuelke et al. |
| 6,428,019 | B1 | 8/2002 | Kincad et al. |
| 6,811,166 | B2 | 11/2004 | Carlstedt et al. |
| 7,207,574 | B2 | 4/2007 | Gradu et al. |
| 7,290,772 | B2 | 11/2007 | Taneda et al. |
| 7,309,074 | B2 | 12/2007 | Teneda |
| 7,717,437 | B2 | 5/2010 | Adams, III et al. |
| 7,832,739 | B2 | 11/2010 | Pinkos et al. |
| 7,837,202 | B2 | 11/2010 | Taneda et al. |
| 8,485,539 | B2 | 7/2013 | Bidlake et al. |
| 8,690,174 | B2 | 4/2014 | Grau et al. |
| 9,393,848 | B2 | 7/2016 | Mohrlock et al. |
| 9,416,849 | B2 | 8/2016 | Park et al. |
| 9,586,457 | B2 | 3/2017 | Jeon et al. |
| 9,878,589 | B2 * | 1/2018 | Park ................... B60G 21/0556 |
| 2006/0049601 | A1 | 3/2006 | Matsumoto |
| 2010/0072725 | A1 | 3/2010 | Woellhaf et al. |
| 2015/0151604 | A1 | 6/2015 | Park et al. |
| 2017/0008366 | A1 | 1/2017 | Fussl et al. |
| 2017/0106714 | A1 | 4/2017 | Yang et al. |

FOREIGN PATENT DOCUMENTS

| | | | |
|---|---|---|---|
| DE | 4342360 | 6/1995 | |
| DE | 102009043070 | 3/2011 | |
| EP | 0974477 | 1/2000 | |
| EP | 1321321 | 6/2003 | |
| EP | 2011674 A1 * | 1/2009 | ......... B60G 21/0555 |
| JP | 62-035110 | 2/1987 | |
| KR | 10-2013-0060919 | 6/2013 | |
| KR | 10-2015-0018987 | 2/2015 | |
| KR | 10-1504253 | 3/2015 | |

OTHER PUBLICATIONS

Notice of Allowance dated Oct. 10, 2017, in U.S. Appl. No. 15/095,348.

Office Action dated Dec. 25, 2018, issued in Chinese Patent Application No. 201610972030.8.

* cited by examiner

STABILIZER

CROSS-REFERENCE TO RELATED APPLICATIONS

This application is a continuation of U.S. patent application Ser. No. 15/095,348, filed on Apr. 11, 2016, and claims priority from and the benefit of Korean Patent Application No. 10-2015-0157394, filed on Nov. 10, 2015, and Korean Patent Application No. 10-2015-0159564, filed on Nov. 13, 2015, all of which are hereby incorporated by reference for all purposes as if set forth herein.

BACKGROUND

Field

The present invention relate to an automobile, and more particularly, to a stabilizer equipped with adjusting height at left and right sides of an automotive body.

Discussion of the Background

In general, an automobile absorbs vibration, which is transmitted from a road surface via wheels when the automobile travels, by using a suspension system, thereby providing occupants with a more comfortable ride.

A stabilizer is provided in the automobile to minimize sway of an automotive body in a left and right direction, which is caused when the road surface is vertically winding or the automobile turns to the left and the right.

The stabilizer includes a stabilizer bar, and stabilizer links coupled to both ends of the stabilizer bar.

The stabilizer bar is disposed at a lower side of the automotive body so as to elongate in the left and right direction toward left and right wheels, and each of the stabilizer links has one end coupled to the stabilizer bar, and the other end coupled to a left or right shock absorber, such that the stabilizer bar is connected with the left and right shock absorbers by means of the stabilizer links coupled to both ends of the stabilizer bar.

Meanwhile, recently, an active rotary type stabilizer (ARS), which has an actuator to adjust roll stiffness of the stabilizer bar depending on the circumstances, is widely used.

The active rotary type stabilizer is configured so that a pair of half-stabilizer bars is coupled at both ends of the actuator, and adjusts roll stiffness of the pair of half-stabilizer bars by operating the actuator depending on a degree of the rolling motion of the automobile, thereby stabilizing a posture of the automobile.

SUMMARY

The present invention has been made in an effort to provide a stabilizer capable of improving ride quality and adjustment stability.

The present invention has also been made in an effort to provide a stabilizer capable of preventing damage to an actuator of a stabilizer.

Technical problems of the present invention are not limited to the aforementioned technical problem, and other technical problems, which are not mentioned above, may be clearly understood by those skilled in the art from the following descriptions.

An exemplary embodiment of the present invention provides a stabilizer including: an actuator including a housing, a motor which is disposed in the housing, and a speed reducer which is disposed in one end of the housing and coupled to one end of a rotating shaft of the motor; and a decoupler disposed at the other end of the housing so as to shield the other end of the housing, wherein the decoupler includes: a decoupler external element which is coupled to the actuator, and has a plurality of first protrusions that is formed on an inner circumferential surface of the decoupler external element so as to be spaced apart from each other in a circumferential direction; a decoupler internal element which is coupled to the decoupler external element and a plurality of second protrusion is disposed between the first protrusions; a decoupler elastic element which is disposed in the decoupler external element, and has a plurality of third protrusions which is formed on an outer circumferential surface of the decoupler elastic element, and inserted between the plurality of first protrusions and the plurality of second protrusions.

Other detailed matters of the exemplary embodiment are included in the detailed description and the drawings.

According to an exemplary embodiment of the present invention, the decoupler absorbs impact transmitted to the actuator from at least one of the first stabilizer bar and the second stabilizer bar, thereby improving ride quality and adjustment stability, and preventing damage to the actuator.

According to an the exemplary embodiment of the present invention, a bushing absorbs vibration transmitted from the wheels to the first stabilizer bar and the second stabilizer bar via the stabilizer links, thereby improving ride quality and adjustment stability, and preventing damage to the actuator.

The effect of the present invention is not limited to the aforementioned effect, and other effects, which are not mentioned above, will be clearly understood by those skilled in the art from the claims.

DETAILED DESCRIPTION OF THE ILLUSTRATED EMBODIMENTS

Figure 1:
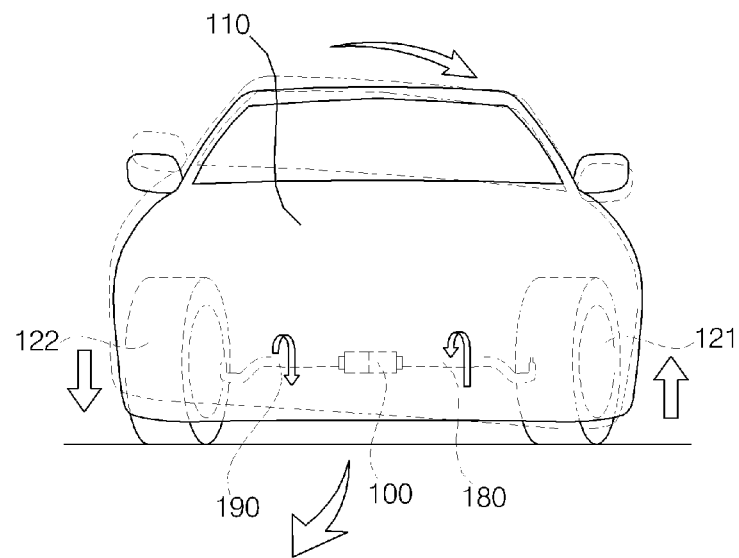
FIG. 1 is a front view illustrating an active rotary type stabilizer for an automobile according to an exemplary embodiment of the present invention.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an automobile according to an exemplary embodiment of the present invention will be described with reference to the drawings.

Figure 2:
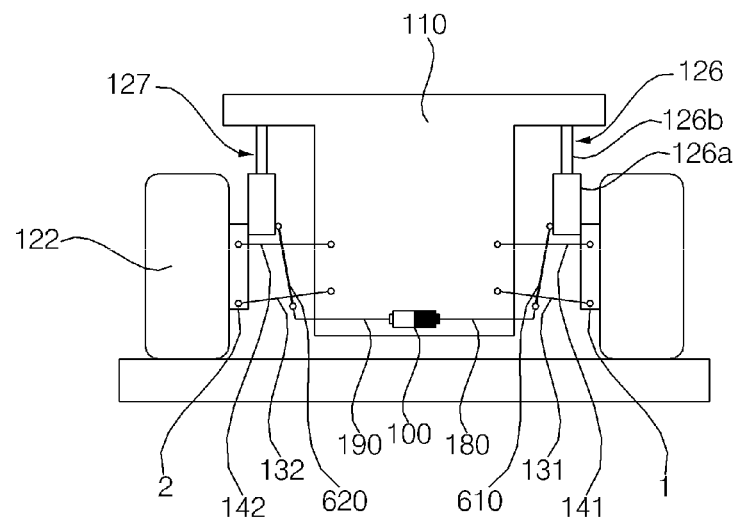
FIG. 2 is a conceptual view illustrating a suspension system for an automobile according to the exemplary embodiment of the present invention.

FIG. 1 is a front view illustrating an active rotary type stabilizer for an automobile according to an exemplary embodiment of the present invention, and FIG. 2 is a conceptual view illustrating a suspension system for an automobile according to the exemplary embodiment of the present invention.

Referring to FIGS. 1 and 2, an automobile according to an exemplary embodiment of the present invention includes an automotive body 110, and an active rotary type stabilizer which is disposed at a lower side of the automotive body 110 and adjusts heights at left and right sides of the automotive body 110 when the automobile travels. The active rotary type stabilizer includes stabilizer bars 180 and 190 which extend in a left and right direction toward a left wheel 121 and a right wheel 122, and an actuator 100 which is coupled at a center in the left and right direction of the stabilizer bars 180 and 190 and generates and provides a predetermined rotational force to the stabilizer bars 180 and 190.

Stabilizer links 610 and 620 are coupled to both ends of the stabilizer bars 180 and 190. That is, each of the stabilizer bars 180 and 190 has one end which is coupled to the actuator 100 and rectilinearly extends in the left and right direction, and the other end which is not coupled to the actuator 100 and is bent. One end of each of the stabilizer links 610 and 620 is coupled to an end of the bent portion of each of the stabilizer bars 180 and 190. Further, the other end of each of the stabilizer links 610 and 620 is coupled to a shock absorber 126 or 127.

The stabilizer bars 180 and 190 include a first stabilizer bar 180 which is coupled to a left end of the actuator 100 and extends toward the left wheel 121, and a second stabilizer bar 190 which is coupled to a right end of the actuator 100 and extends toward the right wheel 122. Further, the stabilizer links 610 and 620 include a left stabilizer link 610 which is coupled to the first stabilizer bar 180, and a right stabilizer link 620 which is coupled to the second stabilizer bar 190.

The shock absorbers 126 and 127 include a left shock absorber 126 which connects the left wheel 121 and the automotive body 110, and a right shock absorber 127 which connects the right wheel 122 and the automotive body 110. The left shock absorber 126 and the right shock absorber 127 elastically support the automotive body 110, and serve to absorb vibration which is transferred from a road surface to the automotive body 110 via the left and right wheels 121 and 122 when the automobile travels.

Each of the shock absorbers 126 and 127 includes a strut tube 126a, and a strut rod 126b which is extended from the strut tube 126a and inserted into the strut tube 126a when the left and right wheels 121 and 122 bumps and rebounds. An upper end of the strut rod 126b is coupled to the automotive body 110.

The left and right wheels 121 and 122 illustrated in FIG. 2 are exemplified as front wheels for an automobile, and in the case of the front wheels, the strut tubes 126a are coupled to knuckles 1 and 2 which support the left and right wheels 121 and 122 so that the left and right wheels 121 and 122 are rotatable. However, in a case in which the left and right wheels 121 and 122 are rear wheels, the strut tubes 126a are coupled to upper portions of lower arms 131 and 132 to be described below.

The knuckles 1 and 2 include a left knuckle 1 which supports a carrier, on which the left wheel 121 is mounted, so that the carrier is rotatable, and a right knuckle 2 which supports a carrier, on which the right wheel 122 is mounted, so that the carrier is rotatable.

Upper arms 141 and 142 are coupled to upper portions of the knuckles 1 and 2, and the lower arms 131 and 132 are coupled to lower portions of the knuckles 1 and 2. The upper arms 141 and 142 are disposed above the lower arms 131 and 132, and the lower arms 131 and 132 are disposed below the upper arms 141 and 142.

The upper arms 141 and 142 include a left upper arm 141 which connects the left wheel 121 and the automotive body 110, and a right upper arm 142 which connects the right wheel 122 and the automotive body 110.

The lower arms 131 and 132 include a left lower arm 131 which connects the left wheel 121 and the automotive body 110, and a right lower arm 132 which connects the right wheel 122 and the automotive body 100.

A right end of the first stabilizer bar 180 is coupled to the left end of the actuator 100, and a left end of the first stabilizer bar 180 is coupled to the right end of the left stabilizer link 610. Further, a left end of the left stabilizer link 610 is coupled to the left shock absorber 126. A right end of the left stabilizer link 610 is rotatably coupled to the left end of the first stabilizer bar 180, and the left end of the left stabilizer link 610 is rotatably coupled to the left shock absorber 126.

A left end of the second stabilizer bar 190 is coupled to the right end of the actuator 100, and a right end of the second stabilizer bar 190 is coupled to the left end of the right stabilizer link 620. Further, a right end of the right stabilizer link 620 is coupled to the right shock absorber 127. A left end of the right stabilizer link 620 is rotatably coupled to the right end of the second stabilizer bar 190, and the right end of the right stabilizer link 620 is rotatably coupled to the right shock absorber 127.

A left end of the left upper arm 141 is rotatably coupled to the left knuckle 1, and a right end of the left upper arm 141 is rotatably coupled to the automotive body 110. Further, a left end of the right upper arm 142 is rotatably coupled to the automotive body 110, and a right end of the right upper arm 142 is rotatably coupled to the right knuckle 2.

A left end of the left lower arm 131 is rotatably coupled to the left knuckle 1, and a right end of the left lower arm 131 is rotatably coupled to the automotive body 110. Further, a left end of the right lower arm 132 is rotatably coupled to the automotive body 110, and a right end of the right lower arm 132 is rotatably coupled to the right knuckle 2.

An operation of the active rotary type stabilizer, which has the aforementioned configurations, will be briefly described below.

First, when the automobile travels straight, the actuator 100 is not operated at all.

Next, when the automobile turns right, the automotive body 110 tilts to the left by inertia. In this case, the actuator 100 is operated to generate rotational force in one direction so as to restore the automotive body 110 to the original position. Then, the first stabilizer bar 180, which is disposed at the left side of the automotive body 110 that becomes relatively lowered, is rotated in one direction, and pushes the left shock absorber 126 by means of the left stabilizer link 610 to raise the automotive body 110, and the second stabilizer bar 190, which is disposed at the right side of the automotive body 110 that becomes relatively raised, is rotated in the other direction, and pulls the right shock absorber 127 by means of the right stabilizer link 620 to lower the automotive body 110 so that the automotive body 110 is restored to the original position.

On the contrary, when the automobile turns left, the automotive body 110 tilts to the right by inertia. In this case, the actuator 100 is operated to generate rotational force in the other direction so as to restore the automotive body 110 to the original position. Then, the first stabilizer bar 180, which is disposed at the left side of the automotive body 110 that becomes relatively raised, is rotated in the other direction, and pulls the left shock absorber 126 by means of the left stabilizer link 610 to lower the automotive body 110, and the second stabilizer bar 190, which is disposed at the right side of the automotive body 110 that becomes relatively lowered, is rotated in one direction, and pushes the right shock absorber 127 by means of the right stabilizer link 620 to raise the automotive body 110 so that the automotive body 110 is restored to the original position.

As described above, the active rotary type stabilizer for an automobile according to the exemplary embodiment of the present invention adjusts the heights at the left and right sides of the automotive body 110 that tilts to the left or the right in accordance with the direction in which the automobile turns, such that an appearance in which the automobile travels straight is implemented instead of an appearance in which the automobile turns, thereby providing occupants with more comfortable and stable ride quality, and providing adjustment stability of the automobile.

Figure 3:
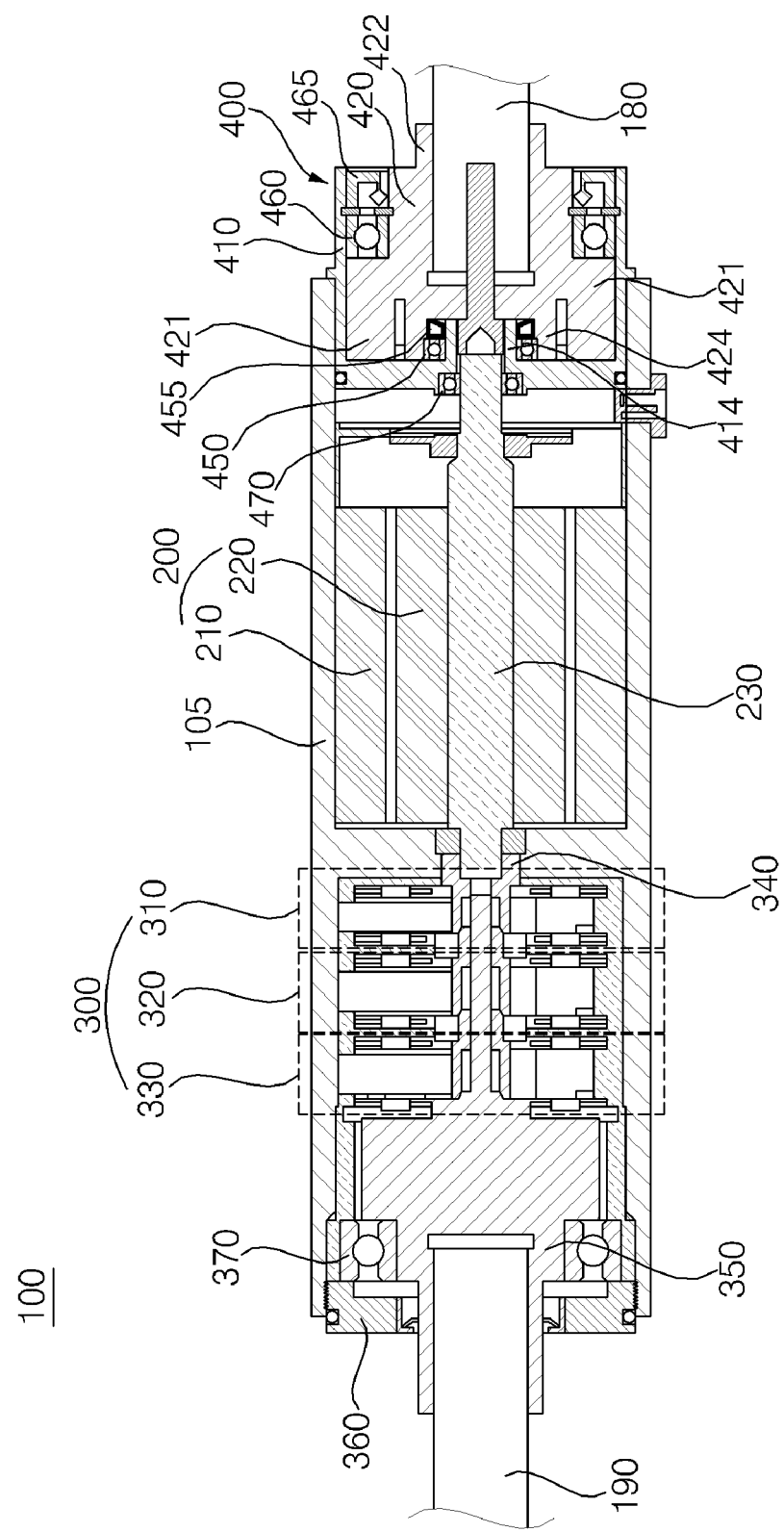
FIG. 3 is a cross-sectional view illustrating the active rotary type stabilizer for an automobile according to the exemplary embodiment of the present invention.
Figure 4:
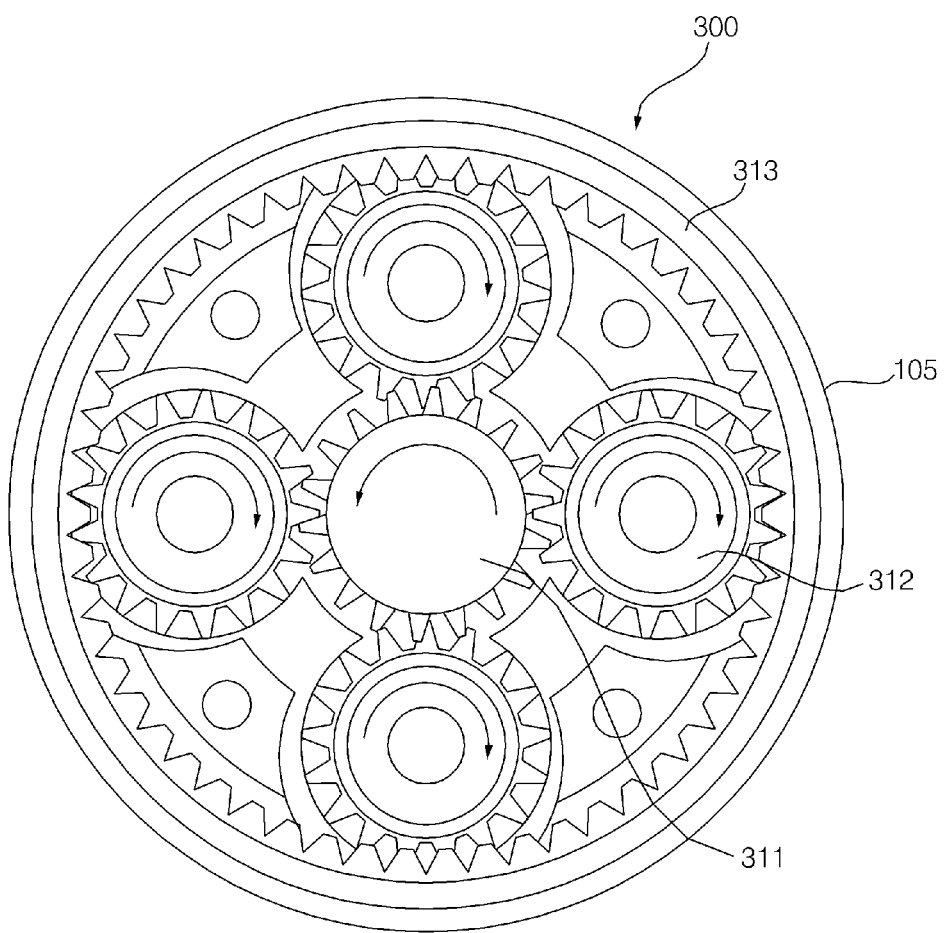
FIG. 4 is a view illustrating one configuration of a plurality of planetary gear sets illustrated in FIG. 3.

FIG. 3 is a cross-sectional view illustrating the active rotary type stabilizer for an automobile according to the exemplary embodiment of the present invention, and FIG. 4 is a view illustrating one configuration of a plurality of planetary gear sets illustrated in FIG. 3.

Referring to FIGS. 3 and 4, the actuator 100 of the active rotary type stabilizer for an automobile according to the exemplary embodiment of the present invention includes a housing 105 which has therein a predetermined space, a motor 200 which is provided in the housing 105 and generates a predetermined rotational force, and a speed reducer 300 which is provided in the housing 105 and reduces the rotational force generated by the motor 200 by a predetermined reduction ratio.

In more detail, the motor 200 may include a stator 210 which is fixed to be adjacent to an inner circumferential surface at one side inside the housing 105, and a rotor 220 which is rotated in the stator 210 by being supplied with electric power. That is, the motor 200 is a kind of drive motor that is operated by electric power. Positions of the stator 210 and the rotor 220 are not limited, and in some exemplary embodiments, the stator 210 may be positioned at an axial center of the housing 105, and the rotor 220 may be disposed to surround an outer circumferential surface of the stator 210 so as to be rotated by being supplied with electric power.

The speed reducer 300 includes three planetary gear sets 310, 320, and 330, which are disposed to be adjacent to the motor 200 and supplied with the rotational force from the motor 200 and primarily, secondarily, and tertiarily reduce the rotational speed. The speed reducer 300 reduces the rotational speed of the motor 200, amplifies the rotational force of the motor 200, and then transmits the rotational force to the second stabilizer bar 190.

The three planetary gear sets 310, 320, and 330 are sequentially disposed in an axial direction. That is, the speed reducer 300 includes a first planetary gear set 310 which is disposed at the leftmost side to be adjacent to the motor 200, a third planetary gear set 330 which is disposed at the rightmost side to be adjacent to the second stabilizer bar 190, and a second planetary gear set 320 which is disposed between the first planetary gear set 310 and the third planetary gear set 330.

The first planetary gear set 310, the second planetary gear set 320, and the third planetary gear set 330 have the same configuration. Each of the first planetary gear set 310, the second planetary gear set 320, and the third planetary gear set 330 includes a sun gear 311, a plurality of planet gears 312 which is disposed around the sun gear 311, and a ring gear 313 which is fixed to an inner circumferential surface of the housing 105 while surrounding the plurality of planet gears 312.

The sun gear 311 is disposed in the ring gear 313 at an axial center of the ring gear 313, and the plurality of planet gears 312 is engaged with the sun gear 311 and the ring gear 313 inside the ring gear 313. When the sun gear 311 is rotated, the plurality of planet gears 312 revolves around the sun gear 311 while being rotated in a direction opposite to the direction in which the sun gear 311 is rotated.

An input shaft 340, which is coupled to a rotating shaft 230 of the motor 200, is coupled at an axial center of the sun gear 311 of the first planetary gear set 310. The input shaft 340 is a portion to which the rotational force of the motor 200 is inputted, and means the input shaft 340 of the speed reducer 300. In addition, an output shaft 350 is coupled to rotating shafts of the plurality of planet gears 312 of the third planetary gear set 330. The output shaft 350 is a portion from which the rotational force of the motor 200, which is amplified by the speed reducer 300, is outputted, and means the output shaft 350 of the speed reducer 300.

The output shaft 350 is spline-coupled to the second stabilizer bar 190, and transmits the rotational force of the motor 200, which is amplified by the speed reducer 300, to the second stabilizer bar 190, thereby twisting the second stabilizer bar 190 in a circumferential direction. One end of the second stabilizer bar 190 is inserted into a central portion of the output shaft 350. The central portion of the output shaft 350 has an outer surface which is directed toward the second stabilizer bar 190 and opened so that one end of the second stabilizer bar 190 may be inserted into the central portion, and gear teeth are formed in the opened inner circumferential surface. In addition, gear teeth, which are engaged with the gear teeth formed in the opened inner circumferential surface of the output shaft 350, are formed in an outer circumferential surface of one end of the second stabilizer bar 190 which is inserted into the central portion of the output shaft 350. When one end of the second stabilizer bar 190 is inserted into the opened central portion of the output shaft 350, the gear teeth formed in the inner circumferential surface of the opened central portion of the output shaft 350 are engaged with the gear teeth formed in the outer circumferential surface of one end of the second stabilizer bar 190, such that the second stabilizer bar 190 and the output shaft 350 are spline-coupled to each other.

One end of the housing 105 is shielded by a decoupler 400. The decoupler 400 is fixed to one end of the housing 105. The first stabilizer bar 180 is coupled to one end of the housing 105 by means of the decoupler 400, such that the first stabilizer bar 180 may be coupled to one end of the actuator 100 by means of the decoupler 400.

The other end of the housing 105 is shielded by a speed reducer cover 360. The speed reducer cover 360 is fixed to the other end of the housing 105. The output shaft 350 of the speed reducer 300 penetrates the speed reducer cover 360, and is disposed to be rotatable relative to the speed reducer cover 360. The output shaft 350 of the speed reducer 300 is rotatably coupled to an inner circumferential surface of the housing 105 by means of a bearing 370.

Meanwhile, the present exemplary embodiment exemplifies that the decoupler 400 is disposed only at one end of the housing 105, and only the first stabilizer bar 180 is coupled to one end of the actuator 100 by means of the decoupler 400, but the decoupler 400 may also be disposed at the other end of the housing 105, such that the second stabilizer bar 190 may be coupled to the other end of the actuator 100 by means of the decoupler 400 instead of being directly coupled to the output shaft 350 of the speed reducer 300.

Figure 5:
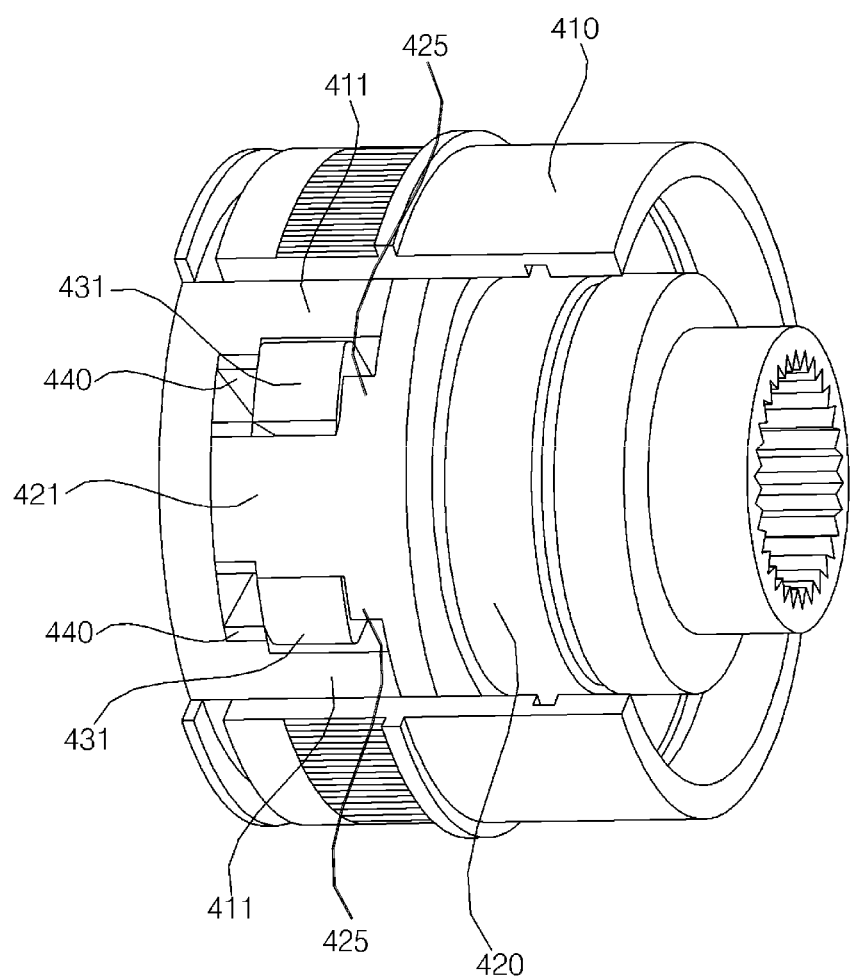
FIG. 5 is a cut-away perspective view illustrating a decoupler illustrated in FIG. 3.
Figure 6:
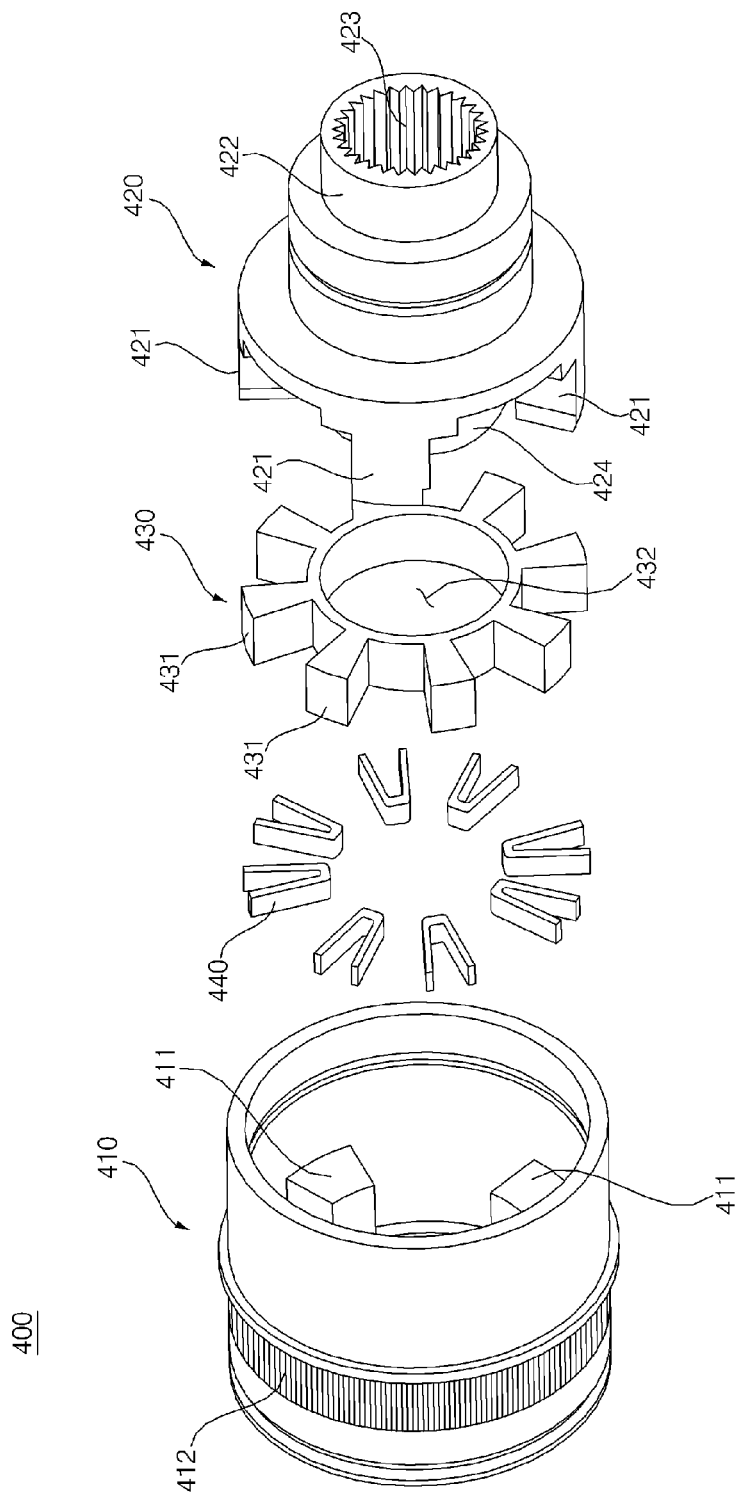
FIG. 6 is an exploded perspective view illustrating the decoupler illustrated in FIG. 5.
Figure 7:
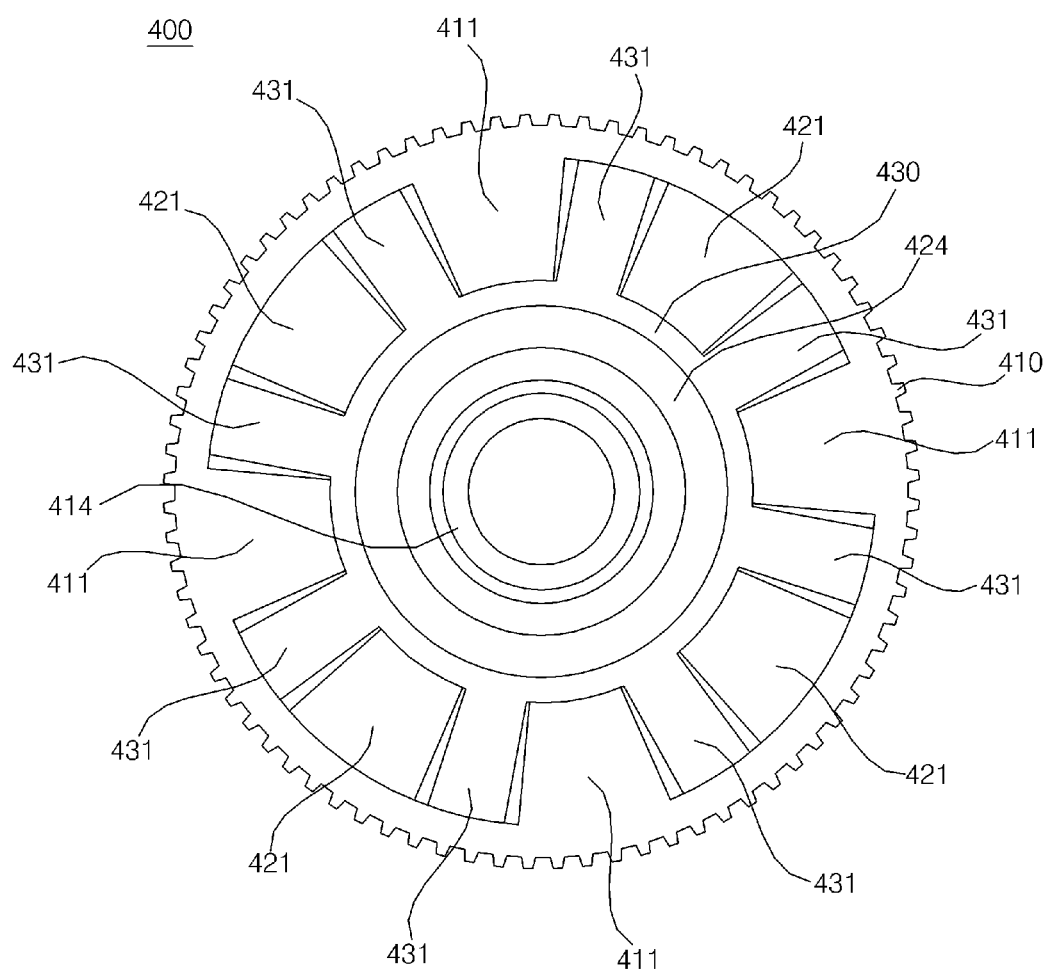
FIG. 7 is a cross-sectional side view illustrating the decoupler illustrated in FIG. 5.

FIG. 5 is a cut-away perspective view illustrating the decoupler illustrated in FIG. 3, FIG. 6 is an exploded perspective view illustrating the decoupler illustrated in FIG. 5, and FIG. 7 is a cross-sectional side view illustrating the decoupler illustrated in FIG. 5.

Referring to FIGS. 3 and 5 to 7, the decoupler 400 includes a decoupler external element 410 which is coupled to the actuator 100, a decoupler internal element 420 which is coupled to an inner circumferential surface of the decoupler external element 410 so that an outer circumferential surface of the decoupler internal element 420 is rotatable, and a decoupler elastic element 430 which is disposed in the decoupler external element 410. The decoupler external element 410 and the decoupler internal element 420 are made of a metallic material, and the decoupler elastic element 430 is made of a rubber material.

A plurality of first protrusions 411, which is spaced apart from each other in a circumferential direction, is formed on the inner circumferential surface of the decoupler external element 410. Four first protrusions 411 are formed on the inner circumferential surface of the decoupler external element 410 so as to be spaced apart from each other in the circumferential direction at an equal interval. The number of the first protrusions 411 is not limited to four.

First splines 412, which are coupled to the actuator 100, are formed on the outer circumferential surface of the decoupler external element 410. The first splines 412 may be engaged with and coupled to splines (not illustrated) formed on the inner circumferential surface of the housing 105 of the actuator 100. The decoupler external element 410 is coupled to the actuator 100 by means of the first splines 412 so as not to be rotated in the circumferential direction.

One end of the first stabilizer bar 180 is inserted into and coupled to the decoupler internal element 420, and one end of the second stabilizer bar 190 is inserted into and coupled to the output shaft 350 of the speed reducer 300. If the decouplers 400 are disposed at both one end and the other end of the actuator 100, one end of the first stabilizer bar 180 is inserted into and coupled to the decoupler internal element 420 disposed at one end of the actuator 100, and one end of the second stabilizer bar 190 is inserted into and coupled to the decoupler internal element 420 disposed at the other end of the actuator 100. Further, if the decoupler 400 is disposed only at the other end of the actuator 100, one end of the first stabilizer bar 180 is directly coupled to the rotating shaft 230 of the motor 200, and one end of the second stabilizer bar 190 is inserted into and coupled to the decoupler internal element 420 disposed at the other end of the actuator 100.

If the decoupler 400 is disposed at the other end of the actuator 100, the output shaft 350 of the speed reducer 300 may penetrate the decoupler external element 410 so as to be rotatably disposed relative to the decoupler external element 410, and may be fixed to the decoupler internal element 420 so as to be rotated together with the decoupler internal element 420. Hereinafter, for ease of description, the configuration in which the decoupler 400 is disposed only at one end of the actuator 100 will be described.

Above, some possible coupling relationships between the decoupler and the actuator are illustrated.

In case of a configuration which the decoupler is disposed to one side of the motor shaft and the speed reducer is coupled to the other side of the motor shaft, when an impact comes through a stabilizer bar coupled to the speed reducer, the impact is transferred to the damping coupler external element (or internal element) through the housing 105, and then absorbed by the elastic element; when an impact comes through a stabilizer bar coupled to the decoupler, the impact is transferred to the damping coupler internal element (or external element), and then absorbed by the elastic element; thereby improving the ride quality of the vehicle equipped with the active revolver.

Hereinafter, for the sake of explanation, it is assumed that the decoupler 400 is arranged only at one end of the actuator 100.

A bar coupling portion 422, into which one end of the first stabilizer bar 180 is inserted and coupled, is formed on the decoupler internal element 420. Second splines 423, which are coupled to one end of the first stabilizer bar, are formed on an inner circumferential surface of the bar coupling portion 422. Splines (not illustrated), which are engaged with the second splines 423, may be formed on an outer circumferential surface of one end of the first stabilizer bar 180 which is inserted into the bar coupling portion 422. When one end of the first stabilizer bar 180 is inserted into the bar coupling portion 422, one end of the first stabilizer bar 180 is spline-coupled to the decoupler internal element 420, and as a result, the decoupler internal element 420 receives force that rotates the decoupler internal element 420 in the circumferential direction, by force that twists the first stabilizer bar 180 in the circumferential direction.

A portion of the decoupler internal element 420 is inserted and disposed into the decoupler external element 410. A plurality of second protrusions 421, which is inserted between the plurality of first protrusions 411, is formed to be spaced apart from each other in the circumferential direction, on the portion of the decoupler internal element 420 which is inserted into the decoupler external element 410. Four second protrusions 421 are formed to be spaced apart from each other at an equal interval in the circumferential direction of the decoupler internal element 420. The number of the second protrusions 421 is not limited to four, and the number of the second protrusions 421 may be equal to the number of the first protrusions 411.

The decoupler elastic element 430 is made of an elastic material. A plurality of third protrusions 431, which is inserted between the plurality of first protrusions 411 and the plurality of second protrusions 421, is formed on the outer circumferential surface of the decoupler elastic element 430. Eight third protrusions 431 are formed to be spaced apart from each other at an equal interval in the circumferential direction on the outer circumferential surface of the decoupler elastic element 430. The number of the third protrusions 431 is not limited to eight, and the number of the third protrusions 431 may be twice the number of the first protrusions 411, and may be twice the number of the second protrusions 421.

In a case in which the decoupler 400 does not include a plurality of springs 440 to be described below, when the plurality of third protrusions 431 is inserted between the plurality of first protrusions 411 and the plurality of second protrusions 421, one surface of each of the third protrusions 431 is in contact with each of the first protrusions 411, and the other surface of each of the third protrusions 431 is in contact with each of the second protrusions 421. When the decoupler internal element 420 is rotated relative to the decoupler external element 410 while the first stabilizer bar 180 is twisted in the circumferential direction, the second protrusions 421 press the third protrusions 431, and as a result, the third protrusions 431 are elastically deformed by the first protrusions 411 and the second protrusions 421, thereby absorbing impact transmitted from the first stabilizer bar 180. A through hole 432 is formed at a center of the decoupler elastic element 430.

Stepped portions 425, which are spaced apart from the first protrusions 411, are formed on the second protrusion 421. The stepped portion 425 is disposed at one side of each of the third protrusions 431. The third protrusion 431 is elastically deformed until the stepped portion 425 comes into contact with the first protrusion 411 when the decoupler internal element 420 is rotated in the circumferential direction.

By forming the step portion 425, during operation of the active rotation stabilizer bar, the torque is not transmitted through the coupler but is transmitted by the direct connection of the driven portion and the driving portion, the response performance is improved as compared with the conventional decoupler structure (by Schaeffler), and the improvement of durability of the coupler rubber can be expected because the coupler rubber of the decoupler is not a torque transmitting element when the step portion is contacted.

A first boss 414 protrudes in an axial direction at an inner center of the decoupler external element 410, and a second boss 424 protrudes in the axial direction at a center of the portion of the decoupler internal element 420 which is inserted into the decoupler external element 410.

The second boss 424 penetrates the through hole 432 formed at the center of the decoupler elastic element 430. The first boss 414 is inserted into the second boss 424. The second boss 424 is rotatably coupled to the first boss 414 by means of a first bearing 450. An outer circumferential surface of the first boss 414 and an inner circumferential surface of the second boss 424 are disposed to be spaced apart from each other. The first bearing 450 is inserted between the outer circumferential surface of the first boss 414 and the inner circumferential surface of the second boss 424 which are spaced apart from each other, such that the inner circumferential surface of the second boss 424 is coupled to the outer circumferential surface of the first boss 414.

A first bearing cover 455 is disposed between the outer circumferential surface of the first boss 414 and the inner circumferential surface of the second boss 424 which are spaced apart from each other. The first bearing cover 455 seals a portion between the outer circumferential surface of the first boss 414 and the inner circumferential surface of the second boss 424 which are spaced apart from each other, thereby protecting the first bearing 450.

The plurality of springs 440 may be further disposed in the decoupler external element 410. The plurality of springs 440 is inserted between the plurality of first protrusions 411 and the plurality of second protrusions 421. Eight springs 440 are provided. The number of the springs 440 is not limited to eight, and the number of the springs 440 may be equal to the number of the third protrusions 431.

A central portion in a longitudinal direction of each of the plurality of springs 440 is bent, and both ends of the spring 440 is disposed to be spaced apart from each other. Each of the plurality of springs 440 is gradually widened from the bent central portion toward both ends. In a state in which the plurality of springs 440 is disposed between the plurality of first protrusions 411 and the plurality of second protrusions 421, one end of each of the springs 440 is disposed to be in contact with each of the first protrusions 411, and the other end of each of the springs 440 is disposed to be in contact with each of the second protrusions 421. When the decoupler internal element 420 is rotated relative to the decoupler external element 410 while the first stabilizer bar 180 is twisted in the circumferential direction, the second protrusions 421 press the springs 440, and as a result, each of the springs 440 is narrowed by the first protrusion 411 and the second protrusion 421, thereby absorbing impact transmitted from the first stabilizer bar 180.

In a case in which the plurality of springs 440 is further inserted between the plurality of first protrusions 411 and the plurality of second protrusions 421, the plurality of springs 440 is narrowed to generate elastic force before the plurality of third protrusions 431 is elastically deformed when the decoupler internal element 420 is rotated in the circumferential direction.

The outer circumferential surface of the decoupler internal element 420 may be rotatably coupled to the inner circumferential surface of the decoupler external element 410 by means of a second bearing 460. The second bearing 460 is disposed between the outer circumferential surface of the decoupler internal element 420 and the inner circumferential surface of the decoupler external element 410, such that the outer circumferential surface of the decoupler internal element 420 is rotatably coupled to the inner circumferential surface of the decoupler external element 410.

A second bearing cover 465 is disposed between the outer circumferential surface of the decoupler internal element 420 and the inner circumferential surface of the decoupler external element 410. The second bearing cover 465 seals a portion between the outer circumferential surface of the decoupler internal element 420 and the inner circumferential surface of the decoupler external element 410, thereby protecting the second bearing 460.

Meanwhile, one end of the rotating shaft 230 of the motor 200 is rotatably coupled to the decoupler 400, and the other end of the rotating shaft 230 of the motor 200 is coupled to the input shaft 340 of the speed reducer 300. One end of the rotating shaft 230 of the motor 200 is rotatably coupled to the central portion of the decoupler external element 410 by means of a third bearing 470.

Figure 8:
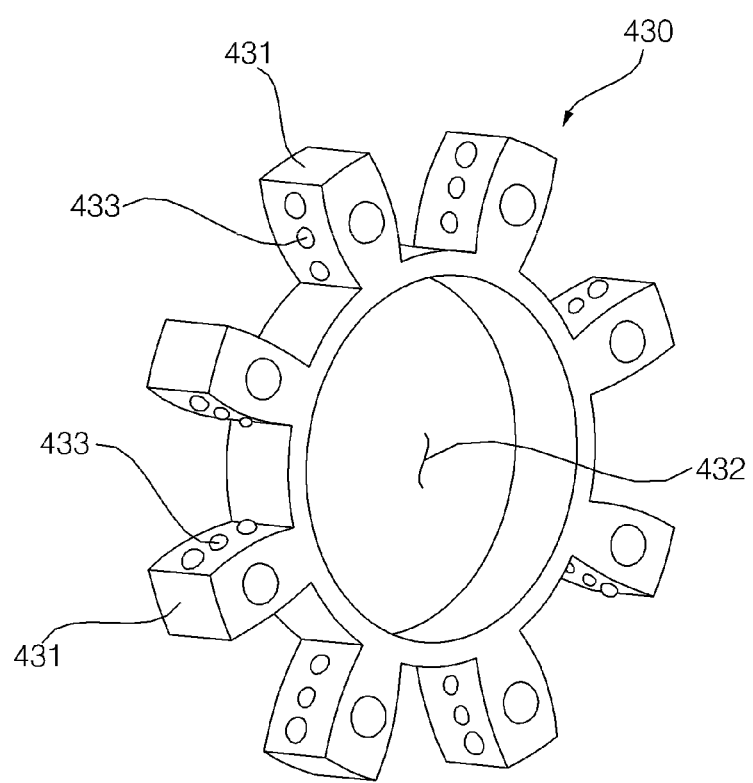
FIG. 8 is a view illustrating another exemplary embodiment of a decoupler elastic element illustrated in FIG. 6.

FIG. 8 is a view illustrating another exemplary embodiment of the decoupler elastic element illustrated in FIG. 6.

Hereinafter, like reference numerals refer to constituent elements identical to those of the decoupler elastic element 430 illustrated in FIG. 6, and a detailed description thereof will be omitted, and only differences between the exemplary embodiments will be described.

Referring to FIG. 8, it can be seen that the decoupler elastic element 430 differs from the decoupler elastic element 430 illustrated in FIG. 6. That is, in comparison with the decoupler elastic element 430 illustrated in FIG. 6, the decoupler elastic element 430 is further provided with embossed portions 433 formed in surfaces of the third protrusions 431 which are in contact with the first protrusions 411 and the second protrusions 421. Three embossed portions 433 are formed in a surface of each of the third protrusions 431 which is in contact with each of the first protrusions 411, and three embossed portions 433 are formed in a surface of each of the third protrusions 431 which is in contact with each of the second protrusions 421. The number of the respective embossed portions 433 is not limited to three, and at least one embossed portion 433 may be formed. When the decoupler internal element 420 is rotated relative to the decoupler external element 410 while the first stabilizer bar 180 is twisted in the circumferential direction, the second protrusions 421 press the embossed portions 433, and as a result, the embossed portions 433 are elastically deformed by the first protrusions 411 and the second protrusions 421, thereby absorbing impact transmitted from the first stabilizer bar 180.

Figure 9:
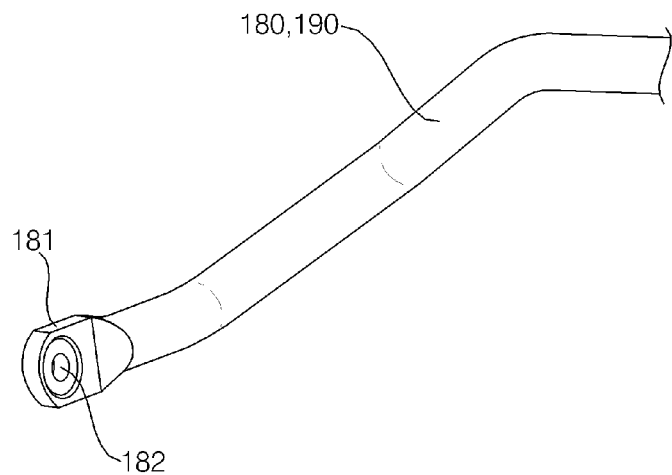
FIG. 9 is a view illustrating both ends of stabilizer bars for a stabilizer according to the exemplary embodiment of the present invention.

FIG. 9 is a view illustrating both ends of the stabilizer bars for a stabilizer according to the exemplary embodiment of the present invention.

Referring to FIG. 9, a plate-shaped coupling portion 181, which is coupled to one end of each of the stabilizer links 610 and 620, is formed at both ends of the stabilizer bars 180 and 190. A fastening hole 182 is formed in the plate-shaped coupling portion 181. A fastening member such as a bolt is inserted into the fastening hole 182, such that the plate-shaped coupling portion 181 may be coupled to one end of each of the stabilizer links 610 and 620.

Figure 10:
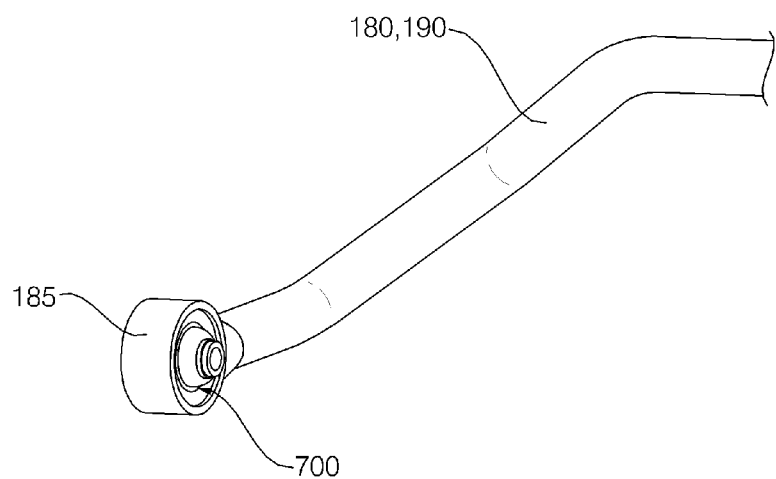
FIG. 10 is a view illustrating another exemplary embodiment of both ends of the stabilizer bars illustrated in FIG. 9.

FIG. 10 is a view illustrating another exemplary embodiment of both ends of the stabilizer bars illustrated in FIG. 9.

Referring to FIG. 10, a circular coupling portion 185, which is coupled to one end of each of the stabilizer links 610 and 620, is formed at both ends of the stabilizer bars 180 and 190. The circular coupling portion 185 is formed in a hollow shape, and has a vacant space formed therein. A bushing 700 is inserted into the vacant space in the circular coupling portion 185. The circular coupling portion 185 is coupled to one end of each of the stabilizer links 610 and 620 by means of the bushing 700.

Figure 11:
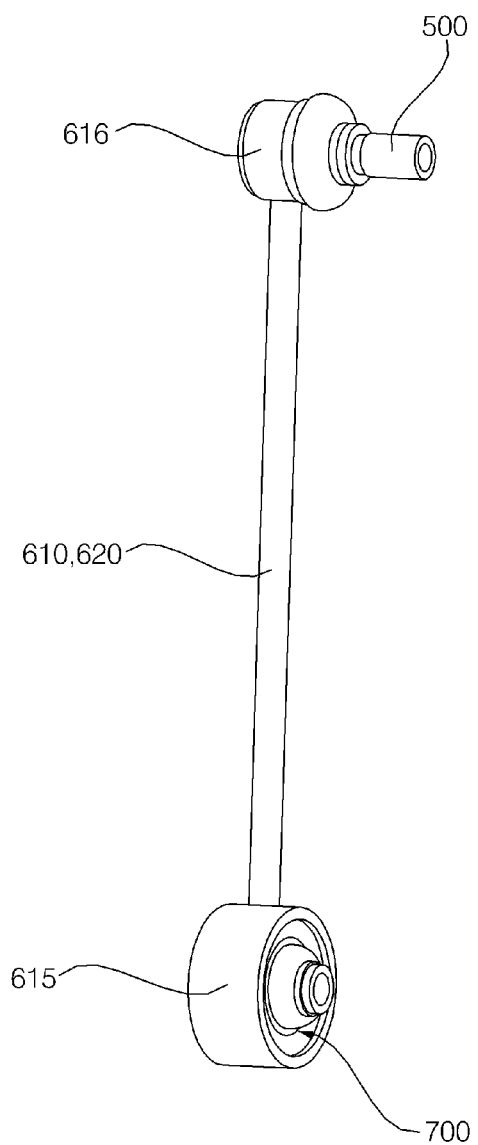
FIG. 11 is a perspective view illustrating a stabilizer link for a stabilizer according to the exemplary embodiment of the present invention.
Figure 12:
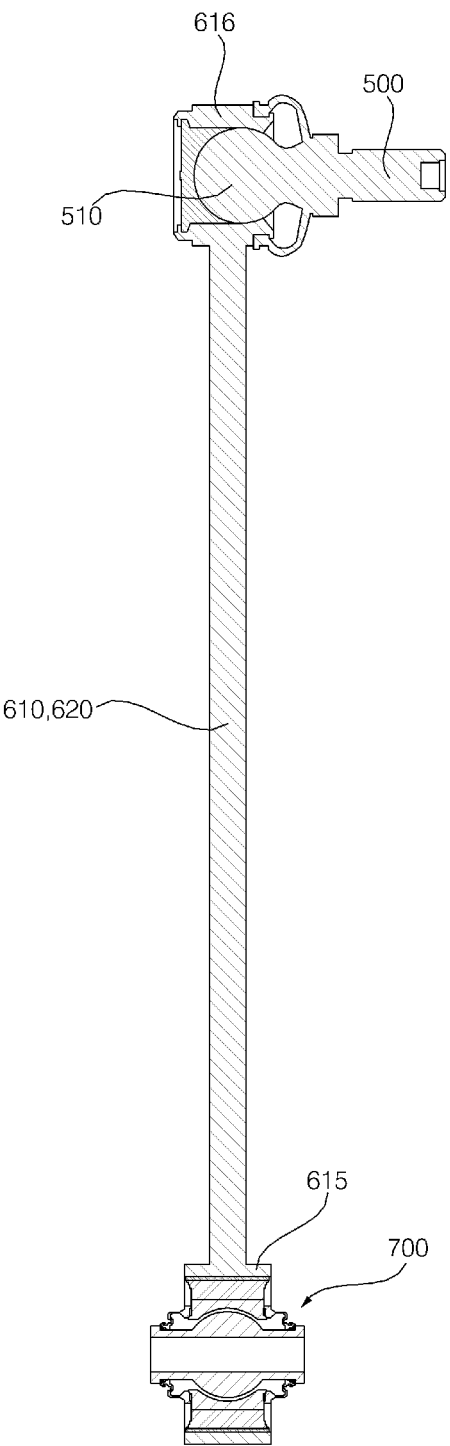
FIG. 12 is a cross-sectional view illustrating the stabilizer link for a stabilizer according to the exemplary embodiment of the present invention.

FIG. 11 is a perspective view illustrating the stabilizer link for a stabilizer according to the exemplary embodiment of the present invention, and FIG. 12 is a cross-sectional view illustrating the stabilizer link for a stabilizer according to the exemplary embodiment of the present invention.

Referring to FIGS. 11 and 12, circular coupling portions 615 and 616 are formed at both ends of each of the stabilizer links 610 and 620. The circular coupling portion 615, which is formed at one end of each of the stabilizer links 610 and 620, is formed in a hollow shape, and has a vacant space formed therein. The bushing 700 is inserted into the vacant space in the circular coupling portion 615. The circular coupling portions 615 are coupled to both ends of the stabilizer bars 180 and 190 by means of the bushings 700. If the plate-shaped coupling portions 181 are formed at both ends of the stabilizer bars 180 and 190 as illustrated in FIG. 9, the plate-shaped coupling portions 181 may be coupled to the circular coupling portions 615 by means of the bushings 700. Further, if the circular coupling portions 185 are formed at both ends of the stabilizer bars 180 and 190 as illustrated in FIG. 10, the bushings 700 inserted into the circular coupling portions 185 and the bushings 700 inserted into the circular coupling portions 615 are coupled to each other by means of fastening members such as bolts, and as a result, the circular coupling portions 185 formed on the stabilizers 180 and 190 may be coupled to the circular coupling portions 615 formed on the stabilizer links 610 and 620.

Meanwhile, a bolt 500 is rotatably coupled to the circular coupling portion 616 formed at the other end of each of the stabilizer links 610 and 620 by means of a spherical ball joint 510. The bolts 500 are fastened to the lower arms 131 and 132, such that the other end of each of the stabilizer links 610 and 620 may be rotatably coupled to each of the lower arms 131 and 132.

As illustrated in FIGS. 9 to 12, the bushing 700 may be inserted into at least one of the other end of the first stabilizer bar 180, the other end of the second stabilizer bar 190, and one end of each of the stabilizer links 610 and 620. A detailed structure of the bushing 700 will be described below.

Figure 13:
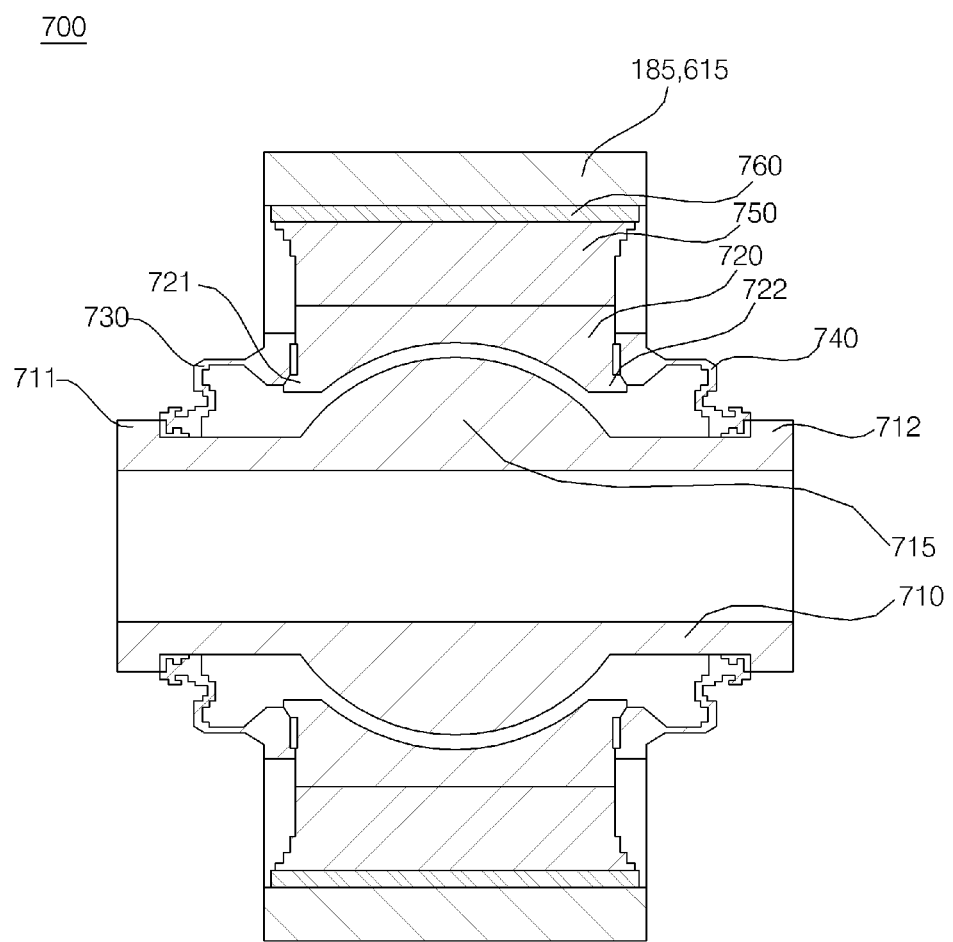
FIG. 13 is a cross-sectional view illustrating a bushing illustrated in FIGS. 10 to 12.

FIG. 13 is a cross-sectional view illustrating the bushing illustrated in FIGS. 10 to 12.

Referring to FIG. 13, the bushing 700 may be coupled to the circular coupling portion 185 or 615 by being press-fitted into the circular coupling portion 185 or 615. The bushing 700 includes a bushing internal element 710, a bushing external element 720, sealers 730 and 740, a bushing elastic element 750, and an outer case 760.

The bushing internal element 710 is made of a metallic material. The bushing internal element 710 elongates in the axial direction, and both ends of the bushing internal element 710 protrudes to the outside of the circular coupling portion 185 or 615. The bushing internal element 710 is formed in a hollow shape, and has a vacant space formed therein. Both ends in the axial direction of the bushing internal element 710 are opened to communicate with the vacant space in the bushing internal element 710. A fastening member such as a bolt may penetrate the vacant space in the bushing internal element 710. Catching projections 711 and 712 protrude in a radial direction from outer circumferential surfaces at both ends in the axial direction of the bushing internal element 710. The catching projections 711 and 712 include a first catching projection 711 which is formed on an outer circumferential surface at one end in the axial direction of the bushing internal element 710, and a second catching projection 712 which is formed on an outer circumferential surface at the other end in the axial direction of the bushing internal element 710. A spherical protrusion 715 is formed on the outer circumferential surface of the bushing internal element 710. The spherical protrusion 715 is formed at a center in the axial direction of the bushing internal element 710, and disposed between the first catching projection 711 and the second catching projection 712.

The bushing external element 720 is made of a metallic material. The bushing external element 720 is disposed in the circular coupling portion 185 or 615. The bushing external element 720 surrounds the spherical protrusion 715 in a state in which the bushing external element 720 is spaced apart from the spherical protrusion 715, and the bushing external element 720 is coupled to the outer circumferential surface of the bushing internal element 710. An inner circumferential surface of the bushing external element 720 is formed as a curved surface corresponding to the spherical protrusion 715, such that when the stabilizer bars 180 and 190 are twisted in the circumferential direction relative to the stabilizer links 610 and 620, the bushing external element 720 may roll along the outer surface of the spherical protrusion 715. Wings 721 and 722 protrude in the axial direction at both ends of the bushing external element 720. The wings 721 and 722 include a first wing 721 which is formed at one end of the bushing external element 720, and a second wing 722 which is formed at the other end of the bushing external element 720. The bushing external element 720 is disposed to be spaced apart from the bushing internal element 710, and a portion between the bushing external element 720 and the bushing internal element 710, which are spaced apart from each other, is filled with a lubricant such as grease.

The bushing external element 720 is coupled to the outer circumferential surface of the bushing internal element 710 by means of the sealers 730 and 740. The sealers 730 and 740 are made of a metallic material. The sealers 730 and 740 serve to couple both ends of the bushing external element 720 to the outer circumferential surface of the bushing internal element 710, and also serve to seal the lubricant interposed between the bushing external element 720 and the bushing internal element 710. The sealers 730 and 740 include a first sealer 730 which couples one end of the bushing external element 720 to the outer circumferential surface at one end of the bushing internal element 710, and a second sealer 740 which couples the other end of the bushing external element 720 to the outer circumferential surface at the other end of the bushing internal element 710. One end of the first sealer 730 is caught by the first wing 721, and the other end of the first sealer 730 is caught by the first catching projection 711 of the bushing internal element 710, such that the first sealer 740 couples one end of the bushing external element 720 to the outer circumferential surface at one end of the bushing internal element 710. In addition, one end of the second sealer 740 is caught by the second wing 722, and the other end of the second sealer 740 is caught by the second catching projection 712 of the bushing internal element 710, such that the second sealer 740 couples the other end of the bushing external element 720 to the outer circumferential surface at the other end of the bushing internal element 710.

The bushing elastic element 750 is made of a rubber material. The bushing elastic element 750 is disposed in the circular coupling portion 185 or 615. The bushing elastic element 750 is coupled to the outer circumferential surface of the bushing external element 720. The bushing elastic element 750 absorbs vibration transmitted from the wheels 121 and 122 to the stabilizer links 610 and 620, thereby minimizing the transmission of the vibration to the stabilizer bars 180 and 190.

The outer case 760 is made of a metallic material. The outer case 760 is disposed in the circular coupling portion 185 or 615. The outer case 760 is coupled to the outer circumferential surface of the bushing elastic element 750, and protects the bushing elastic element 750. In a state in which the bushing 700 is inserted into the circular coupling portion 185 or 615, the outer case 760 is in direct contact with the inner circumferential surface of the circular coupling portion 185 or 615.

Meanwhile, while the active rotary type stabilizer having the configuration in which the actuator 100 is installed at a center in the left and right direction of the stabilizers bars 180 and 190, and the stabilizer bars 180 and 190 include the first stabilizer bar 180 and the second stabilizer bar 190 has been described above, even though the stabilizer bars 180 and 190 are integrally configured without installing the actuator 100 at the center in the left and right direction of the stabilizers bars 180 and 190, the bushing 700 may be inserted into at least one of both ends of the stabilizer bars 180 and 190, and one end of each of the stabilizer links 610 and 620.

As described above, according to the stabilizer according to the exemplary embodiment of the present invention, the decoupler 400 absorbs impact transmitted to the actuator 100 from at least one of the first stabilizer bar 180 and the second stabilizer bar 190, thereby improving ride quality and adjustment stability, and preventing damage to the actuator 100.

According to the stabilizer according to the exemplary embodiment of the present invention, the bushing 700 absorbs vibration transmitted from the wheels 121 and 122 to the first stabilizer bar 180 and the second stabilizer bar 190 via the stabilizer links 610 and 620, thereby improving ride quality and adjustment stability, and preventing damage to the actuator 100.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A stabilizer comprising:
   an actuator including a housing, a motor disposed in the housing, and a speed reducer disposed in one end of the housing and coupled to one end of a rotating shaft of the motor; and
   a decoupler disposed at the other end of the housing so as to shield the other end of the housing,
   wherein the decoupler includes:
   a decoupler external element which has a plurality of first protrusions formed on an inner circumferential surface of the decoupler external element so as to be spaced apart from each other in a circumferential direction;
   a decoupler internal element which is coupled to the decoupler external element, and has a plurality of second protrusions disposed between the first protrusions;
   a decoupler elastic element which is disposed in the decoupler external element, and has a plurality of third protrusions formed on an outer circumferential surface of the decoupler elastic element, and inserted between the plurality of first protrusions and the plurality of second protrusions.

2. The stabilizer of claim 1, further comprising:
   a first boss which is formed at an inner center of the decoupler external element;
   a through hole which is formed at the inner center of the decoupler elastic element;
   a second boss which is formed at the decoupler internal element, wherein the second boss penetrates the through hole in a direction of a lateral center facing the decoupler external element, and the first boss is inserted into the second boss.

3. The stabilizer of claim 2, wherein a first bearing is disposed between an outer circumferential surface of the first boss and an inner circumferential surface of the second boss.

4. The stabilizer of claim 3, wherein a first bearing cover is disposed between the outer circumferential surface of the first boss and the inner circumferential surface of the second boss.

5. The stabilizer of claim 1, wherein a plurality of springs is inserted between the plurality of first protrusions and the plurality of second protrusions.

6. The stabilizer of claim 5, wherein the plurality of springs are formed by bending their longitudinal centers.

7. The stabilizer of claim 5, wherein when the decoupler internal element is rotated in a circumferential direction, the plurality of springs generates elastic force prior to the plurality of third protrusions.

8. The stabilizer of claim 1, wherein first splines, which are coupled to the actuator, are formed on an outer circumferential surface of the decoupler external element.

9. The stabilizer of claim 1, wherein a second bearing is disposed between an outer circumferential surface of the decoupler internal element and the inner circumferential surface of the decoupler external element.

10. The stabilizer of claim 9, wherein a second bearing cover is disposed between a portion between the outer circumferential surface of the decoupler internal element and the inner circumferential surface of the decoupler external element.

11. The stabilizer of claim 1, wherein at least one embossed portion is formed on surfaces of the third protrusions which are in contact with the first protrusions and the second protrusions.

12. The stabilizer of claim 1, wherein a bar coupling portion into which one end of a first stabilizer bar is inserted is formed on the decoupler internal element, and second splines are formed on an inner circumferential surface of the bar coupling portion.

13. The stabilizer of claim 1, wherein the actuator comprises:
an input shaft coupled to the rotating shaft of the motor, and an output shaft coupled to a second stabilizer bar;
an outer circumferential surface of the decoupler external element which is coupled to an inner circumferential surface of the housing;
the rotating shaft of the motor which is rotatably coupled to a central portion of the decoupler external element; and
a first stabilizer bar is coupled to the decoupler internal element.

14. The stabilizer of claim 13, wherein a third bearing is disposed between the central portion of the decoupler external element and the rotating shaft of the motor.

* * * * *